(12) United States Patent
Mahasenan et al.

(10) Patent No.: US 12,720,555 B2
(45) Date of Patent: Aug. 25, 2026

(54) SYSTEMS AND METHODS FOR PERFORMING OPPORTUNISTIC COMMUNICATION IN A WIRELESS MESH NETWORK

(71) Applicant: Apple Inc., Cupertino, CA (US)

(72) Inventors: Arun Vijayakumari Mahasenan, Fremont, CA (US); Venkateswara Rao Manepalli, San Jose, CA (US); Langford M Wasada, Poway, CA (US)

(73) Assignee: Apple Inc., Cupertino, CA (US)

( * ) Notice: Subject to any disclaimer, the term of this patent is extended or adjusted under 35 U.S.C. 154(b) by 833 days.

(21) Appl. No.: 17/951,426

(22) Filed: Sep. 23, 2022

(65) Prior Publication Data

US 2024/0107544 A1 Mar. 28, 2024

(51) Int. Cl.
*H04W 72/23* (2023.01)
*H04W 52/02* (2009.01)
*H04W 84/18* (2009.01)

(52) U.S. Cl.
CPC ....... *H04W 72/23* (2023.01); *H04W 52/0229* (2013.01); *H04W 84/18* (2013.01)

(58) Field of Classification Search
CPC . H04W 72/23; H04W 52/0229; H04W 84/18; H04W 52/0216
See application file for complete search history.

(56) References Cited

U.S. PATENT DOCUMENTS

2007/0281617 A1* 12/2007 Meylan ............ H04W 74/0808 455/501
2015/0171954 A1* 6/2015 Gatewood ............... H04B 7/26 455/39
2019/0174418 A1* 6/2019 Kencharla ......... H04W 52/0216
2019/0174546 A1* 6/2019 Jeon .................. H04W 74/0816
2023/0379822 A1* 11/2023 de Ruijter ......... H04W 52/0229

* cited by examiner

*Primary Examiner* — Sun Jong Kim
(74) *Attorney, Agent, or Firm* — FLETCHER YODER PC

(57) ABSTRACT

Embodiments described herein include techniques for localizing devices connected to wireless networks, such as wireless mesh networks. A device connected to a wireless mesh network may maintain and share information, such as location data and identifiers, regarding the device and other devices connected to the device. The device itself or a computing system to which the device connects may determine locations for the devices in the wireless mesh network and generate a device map that indicates the locations of the devices.

20 Claims, 6 Drawing Sheets

SYSTEMS AND METHODS FOR PERFORMING OPPORTUNISTIC COMMUNICATION IN A WIRELESS MESH NETWORK

BACKGROUND

The present disclosure relates generally to wireless communication, and more specifically to the operation of transmitters and receivers in wireless communication devices.

In an electronic device, a transmitter and a receiver may each be coupled to an antenna to enable the electronic device to both transmit and receive wireless signals. Electronic devices may communicate wirelessly in several types of networks and in accordance with several standards. One such type of network is a low-rate wireless personal area network (LR-WPANs), whose operation is defined in Institute of Electrical and Electronics Engineers (IEEE) Standard 802.15.4 (also known as "IEEE Standard for Low-Rate Wireless Networks"). IEEE Standard 802.15.4 provides the basis for several networking specifications, such as Zigbee, WirelessHART, 6LoWPAN, Thread, and SNAP.

In wireless networks such as IEEE Standard 802.15.4 networks, electronic devices in the network may send data opportunistically, meaning the data may not be transmitted in real-time. For example, the device may include a sensor that collects data regarding a particular condition and attempts to send the collected data via the wireless network to another device connected to the wireless network. The data may be collected over a period of time or potentially aggregated and transmitted at a later time. However, a transceiver of the device to which the data will be sent may be utilized for other communication (e.g., wireless communication). Prior to sending the data, an application associated with the device that is to transmit the data may send a request to utilize the transceiver (e.g., to transmit or receive the data) and receive a response indicating whether the transceiver is available. However, when the transceiver of the receiving device is being utilized (e.g., to transmit data to, or receive data from, another device using another wireless protocol in a same radio frequency spectrum), the device may receive an indication that the transceiver is unavailable, and the electronic device may be unable to receive the data that is to be transmitted by the other device. As such, the application may continue to send requests until the request is granted, which may cause the device to wake up or activate from a sleep mode frequently utilize an undesirable amount of electrical power.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to techniques for managing opportunistic communication between electronic devices in wireless networks, such as mesh wireless networks. As noted above, a first electronic device may collect data (e.g., sensor data) and transmit the data to a second electronic device via a wireless network, such as a wireless mesh network. The second device may execute a software application associated with the first device, for instance, to manage the first device or view information regarding the first device. The application may sample data from the first device for a variety of reasons, including to monitor the health of the first device or to display information (e.g., the data) to a user of the second electronic device. The sampling may occur opportunistically, meaning the application may send grant requests to another application executed by the second electronic device, for example, for a time slot to receive the data that is to be transmitted by the first electronic device. However, such data may not be receivable, for instance, due to the transceiver of the second electronic device being actively used for communicating with yet another device using yet another communication protocol. As such, the application may send repeated requests to transmit data, which may consume an undesirable amount of power (e.g., battery life) of the second electronic device. For example, rather than being run in the background or another reduced power utilization state, the application may remain active and continue to consume power and processing resources of the second electronic device. As described below, a manager (e.g., management software) may be utilized to manage opportunistic communication to enable the transmitting devices to successfully transmit data (e.g., upon exiting the low-energy state). For instance, continuing with the example above in which the first device may transmit sensor data to the second device, the manager may be implemented on the second device, and the manager may send time slot data to the application executing on the second device. The time slot data may be indicative of one or more time slots during which the transceiver of the second device will likely to be available to transmit or receive data. Thus, the time slots correspond to when the first device is (more) likely to be able to transmit the sensor data. The application may then be able to send a future grant request to the manager during one of the time slots indicated by the time slot data (and gain access to the transceiver) instead of potentially sending several more grant requests that could be denied due to the transceiver being actively used for communicating with another device. Furthermore, the manager may send a command to the application, which may be in a low-energy state, to awaken the application during one of the time slots indicated by the time slot data to enable the application to have access to the transceiver.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
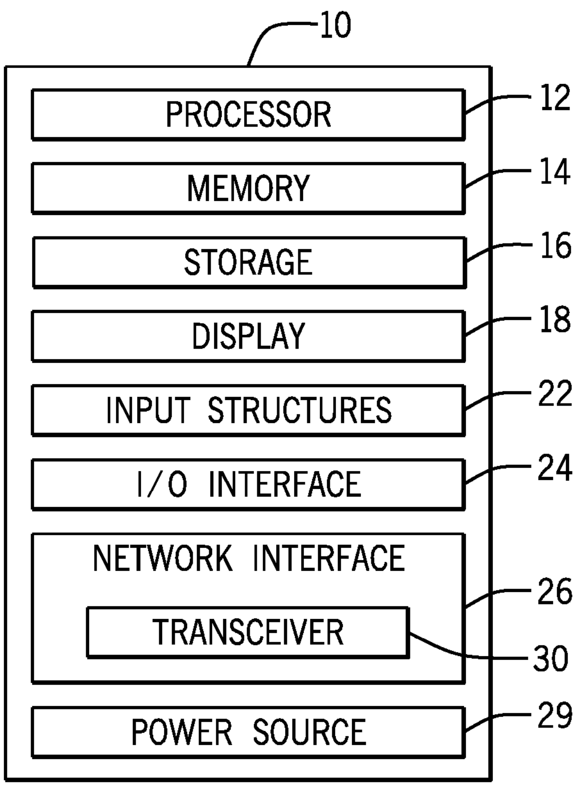
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

The present disclosure relates to techniques for managing opportunistic communication between electronic devices in wireless networks, such as mesh wireless networks. As noted above, a first electronic device may collect data (e.g., sensor data) and transmit the data to a second electronic device via a wireless network, such as a wireless mesh network. The second device may execute an application associated with the first device, for instance, to manage the first device or view information regarding the first device. The application may sample data from the first device for a variety of reasons, including to monitor the health of the first device or to display information (e.g., the data) to a user of the second electronic device. The sampling may occur opportunistically, meaning the application may send grant requests to another application executed by the second electronic device, for example, for a time slot to receive the data that is to be transmitted by the first electronic device. However, such data may not be receivable, for instance, due to the transceiver of the second electronic device being actively used for communicating with yet another device. As such, the application may send repeated requests to transmit data, which may consume an undesirable amount of power (e.g., battery life) of the second electronic device. For example, rather than being run in the background or another reduced power utilization state, the application may remain active and continue to consume power and processing resources of the second electronic device. As described below, a manager (e.g., management software) may be utilized to manage opportunistic communication to enable the transmitting devices to successfully transmit data (e.g., upon exiting the low-energy state). For instance, continuing with the example above in which the first device may transmit sensor data to the second device, the manager may be implemented on the second device, and the manager may send time slot data to the application executing on the second device. The time slot data may be indicative of one or more time slots during which the transceiver of the second device will likely to be available to transmit or receive data. Thus, the time slots correspond to when the first device is (more) likely to be able to transmit the sensor data. The application may then be able to send a future grant request to the manager during one of the time slots indicated by the time slot data (and gain access to the transceiver) instead of potentially sending several more grant requests that could be denied due to the transceiver being actively used for communicating with another device. Furthermore, the manager may send a command to the application, which may be in a low-energy state, to awaken the application during one of the time slots indicated by the time slot data to enable the application to have access to the transceiver.

Keeping the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), a smart speaker, home automation equipment (including, but not limited to switches, outlets, controllers, irrigation or sprinkler system equipment, sensors, lights, thermostats), wireless (or wired) routers, network extenders, or power equipment (e.g., controllers, power storage devices, solar panels)), a smart appliance (e.g., refrigerator, dishwasher, washer, dryer, etc.), smart door lock, and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a LR-WPAN or an ultra-wideband (UWB) or a BLUETOOTH® network, a local area network (LAN) or wireless local area network (WLAN), such as a network employing one of IEEE 802.11x family of protocols (e.g., WI-FI®), and/or a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
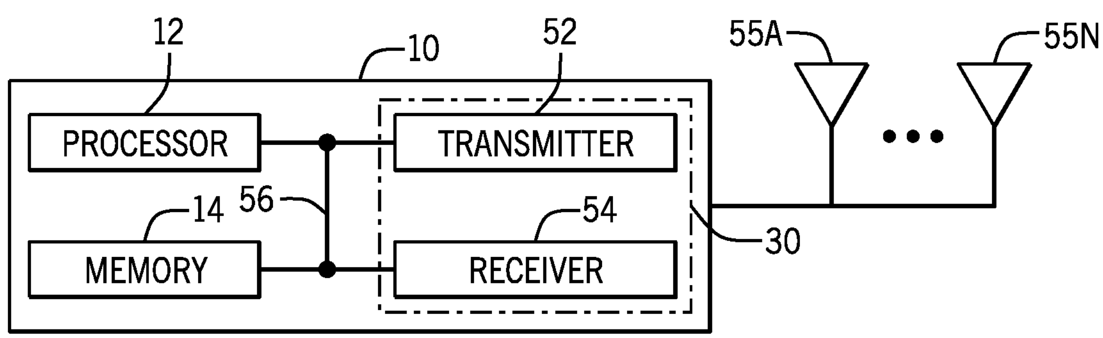
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
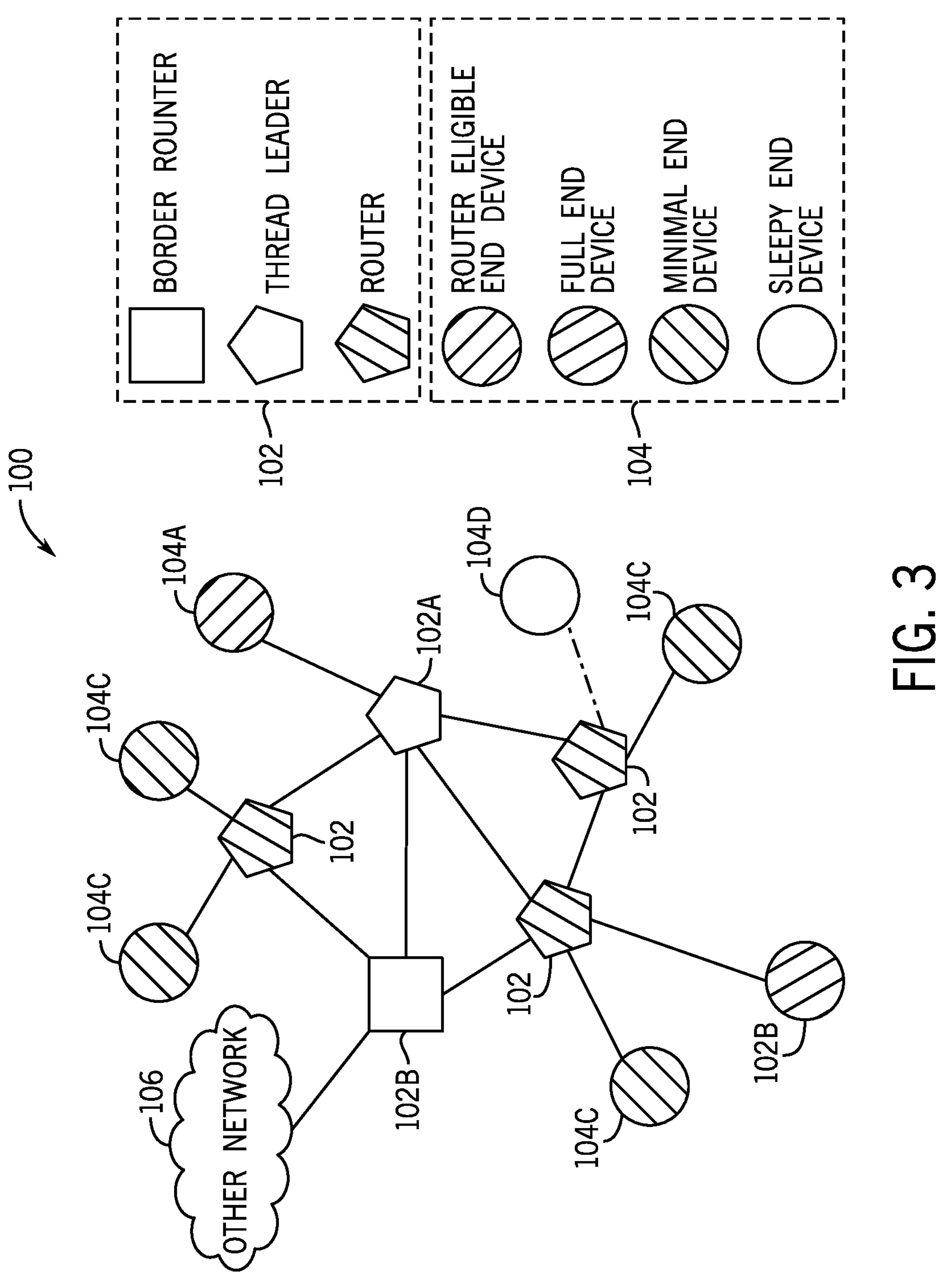
FIG. 3 is a schematic diagram of an IEEE Standard 802.15.4-based Thread network that may include the electronic device of FIG. 1 as a node, according to embodiments of the present disclosure.

FIG. 3 is a schematic diagram of a wireless network 100 in which the electronic device 10 may be connected. In particular, the wireless network 100 is a LR-WPAN, and, even more particularly, a Thread network. While the techniques described herein may be described with respect to the Thread network, it should be noted that the techniques may be utilized with other types of wireless networks, including, but not necessarily limited to, any IEEE Standard 802.15.4 network, such as a Zigbee network. For example, the techniques of the present disclosure may be utilized in wireless mesh networks, which generally refers to wireless networks that utilize a mesh topology. For instance, wireless mesh networks may follow a WLAN topology in which the nodes (e.g., devices connected to the mesh network) connect directly, dynamically, and non-hierarchically to other nodes (e.g., as many nodes as possible) and cooperate with one another to route data to and from devices. Wireless mesh networks include, but are not limited to, IEEE Standard 802.15.4 networks.

The wireless network 100 includes several nodes (e.g., routers 102 and end devices 104) that are connected to one another as illustrated in FIG. 3. Each of the nodes is an electronic device included in the wireless network 100. As illustrated, there are several types of nodes in the wireless network 100. Depending on the capabilities of the electronic device 10, the electronic device 10 may be one or more of any of the types of nodes. The particular types of nodes included in the wireless network 100 include routers 102 (collectively referring to routers 102 (e.g., routers that are not further classified as discussed below), thread leader 102A, and border router 102B) and end devices 104 (collectively referring to end devices 104A, 104B, 104C, 104D). Routers 102 are nodes that forward packets for network devices, provide secure commissioning services for devices attempting to join the wireless network 100, and keep their transceiver(s) enabled at all times. End devices 104 are nodes that do not forward packets for other network devices, communicate (primarily) with a single router 102, and may disable their transceiver(s) to reduce power. As discussed below, routers 102 and some end devices 104 may also be classified as full Thread devices, while other end devices may be classified as minimal Thread devices. A full Thread device may always have its radio on, maintain IPv6 address mappings, and subscribe to an all-routers multicast address. Minimal Thread devices may not subscribe to the all-routers multicast address and forward their messages to a router 102 (or an end device 104 that is functioning as a router 102).

Within the classification of routers 102, there may be several types of routers 102. For example, a router 102 may be a thread leader 102A, which manages the other routers in the wireless network 100. A router 102 may also be a border router 102B, which is a device that can forward data to another network 106, such as a network other than a Thread network (e.g., a Wi-Fi® network). Routers 102 are full Thread devices.

Within the classification of end devices 104, there are router eligible end devices 104A, full end devices 104B, minimal end devices 104C, and sleepy end devices 104D. Router eligible end devices 104A and full end devices 104B are full Thread devices. More specifically, router eligible end devices 104A are end devices 104 that can be promoted to function as a router 102, while full end devices 104B are end devices 104 that are full Thread devices but cannot be promoted to be a router 102. Minimal end devices 104C and sleepy end devices 104D are minimal Thread devices. In particular, a minimal end device 104C does not need to poll for messages sent from the router 102 to which the minimal end device 104C is connected, and the minimal end device's 104C transceiver is always on. A sleepy end device 104D is an end device 104 that is typically in sleep and wakes up occasionally to poll for messages from the router 102 to which it is connected.

The wireless network 100 may be implemented indoors (e.g., within a dwelling or office space), outdoors, or both. The nodes may include electrical devices including, but not limited to, the electronic devices listed above that the electronic device 10 may be. For instance, the nodes (which include the electronic device 10) may be a phone, tablet, computer, a portable electronic or handheld electronic, a wearable electronic device, a smart speaker, home automation equipment (including, but not limited to switches, outlets, controllers, irrigation or sprinkler system equipment, sensors, lights, thermostats), a smart appliance, a smart door lock, wireless routers, network extenders, or power equipment), or any combination thereof.

Figure 4:
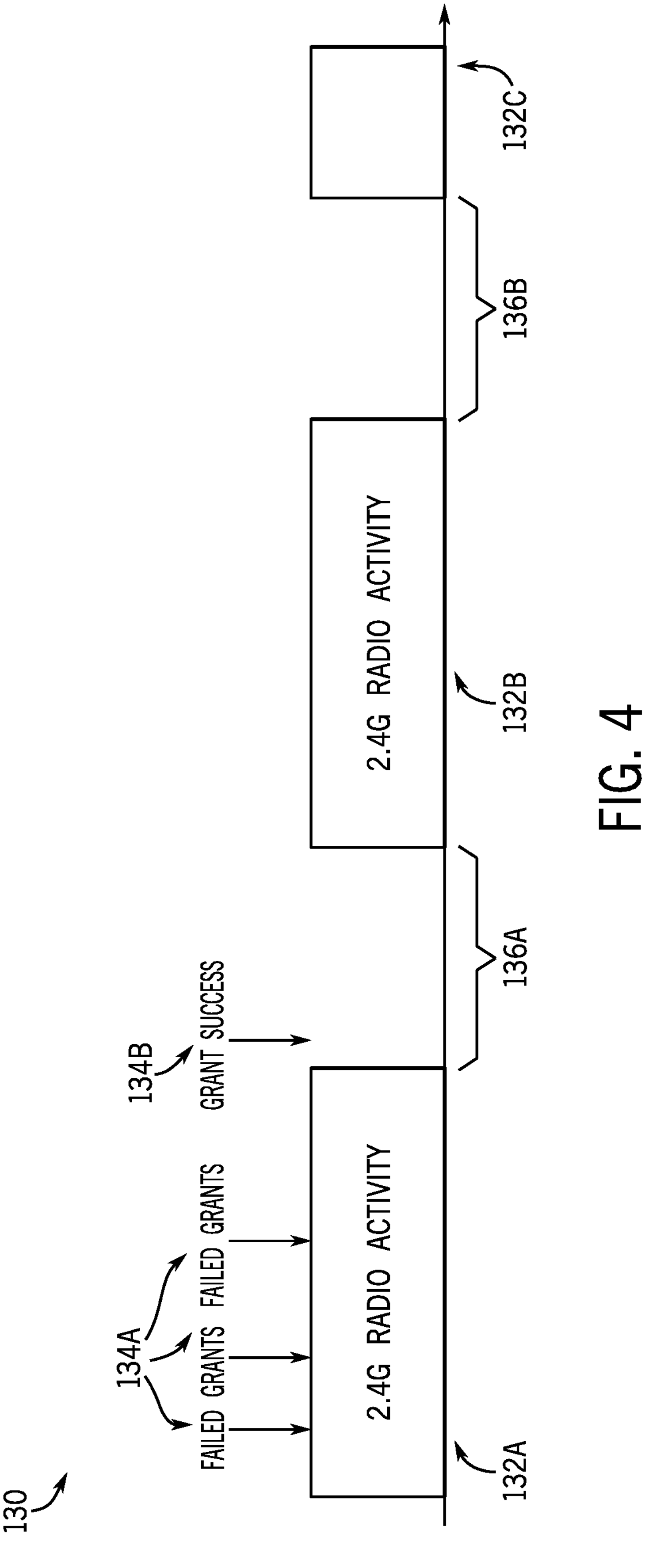
FIG. 4 is a timing diagram showing periods of radio activity of the transceiver of the electronic device of FIG. 1, according to embodiments of the present disclosure.

As noted above, the present disclosure relates to techniques for managing opportunistic communication between electronic devices in wireless networks, such as the wireless network 100 or other mesh wireless networks. Bearing this in mind, FIG. 4 is a timing diagram 130 showing periods 132 (collectively referring to period 132A, period 132B, and period 132C) of radio activity of a transceiver of an electronic device, such as the transceiver 30 of the electronic device 10. In other words, the timing diagram 130 indicates when the transceiver 30 may be utilized for wireless communication, for instance, to transmit or receive data in a wireless network such as the wireless network 100. More specifically, in the illustrated embodiment, the periods 132 may be time ranges during which the transceiver 30 is communicating using frequencies in the 2.4 gigahertz (GHz) frequency band that may be utilized for wireless communication such as communication in the wireless network 100, communication in WI-FI® networks, BLUETOOTH® communication, communication employing one of IEEE 802.11x protocols, or communication in an IEEE 802.15.4 network. While the 2.4 GHz frequency band is named, it should be noted that the techniques described herein are not limited to the 2.4 GHz frequency band and may be utilized in conjunction with wireless communication across any other suitable frequency band or range.

The processor 12 or transceiver 30 of the electronic device 10 may receive grant requests from software applications associated with other devices, such as nodes of the wireless network 100 that may include smart devices that are or include one or more types of sensors that may collect sensor data. Such devices may communicate opportunistically, for instance, by an application associated with the devices executed by the processor 12 and requesting access to the transceiver 30. When the grant is successful (e.g., the request is granted), the application may receive data transmitted to the electronic device 10. However, when grant requests, such as grant requests 134A, are sent during a period of radio activity, such as the period 132A, the grant request results in a failed grant, meaning the electronic device 10 may not be able to receive the data that is to be transmitted by the other device(s) in the wireless network 100. As such, the application may repeatedly send grant requests at an interval of time until the device is able to transmit the data, which may lead to undesired power consumption. For instance, the application associated with the device that is to transmit the data may send grant requests until there is a grant success, which may occur when a grant request (e.g., grant request 134B) is sent during a time slot (e.g., time slot 136A or time slot 136B) in which the transceiver 30 is in a low radio activity state. A low radio state, which may also be referred to as "no radio activity state," may occur when the transceiver 30 is not being utilized to communicate (e.g., over the 2.4 GHz frequency band) or is otherwise idle. In other words, when the transceiver 30 is in a state or mode of operation (e.g., idle state, non-operational state, idle mode, or non-operational mode) in which the transceiver 30 is not transmitting or receiving, a grant success may occur. However, because the application may send several grant requests, the application may not be able to operate in a lower power state on the electronic device, which may cause an undesired amount of power of the electronic device 10 to be consumed. Moreover, due to several grant requests being denied, the application may not receive data that a user of the application may wish to view (e.g., via the display 18 of the electronic device 10).

Figure 5:
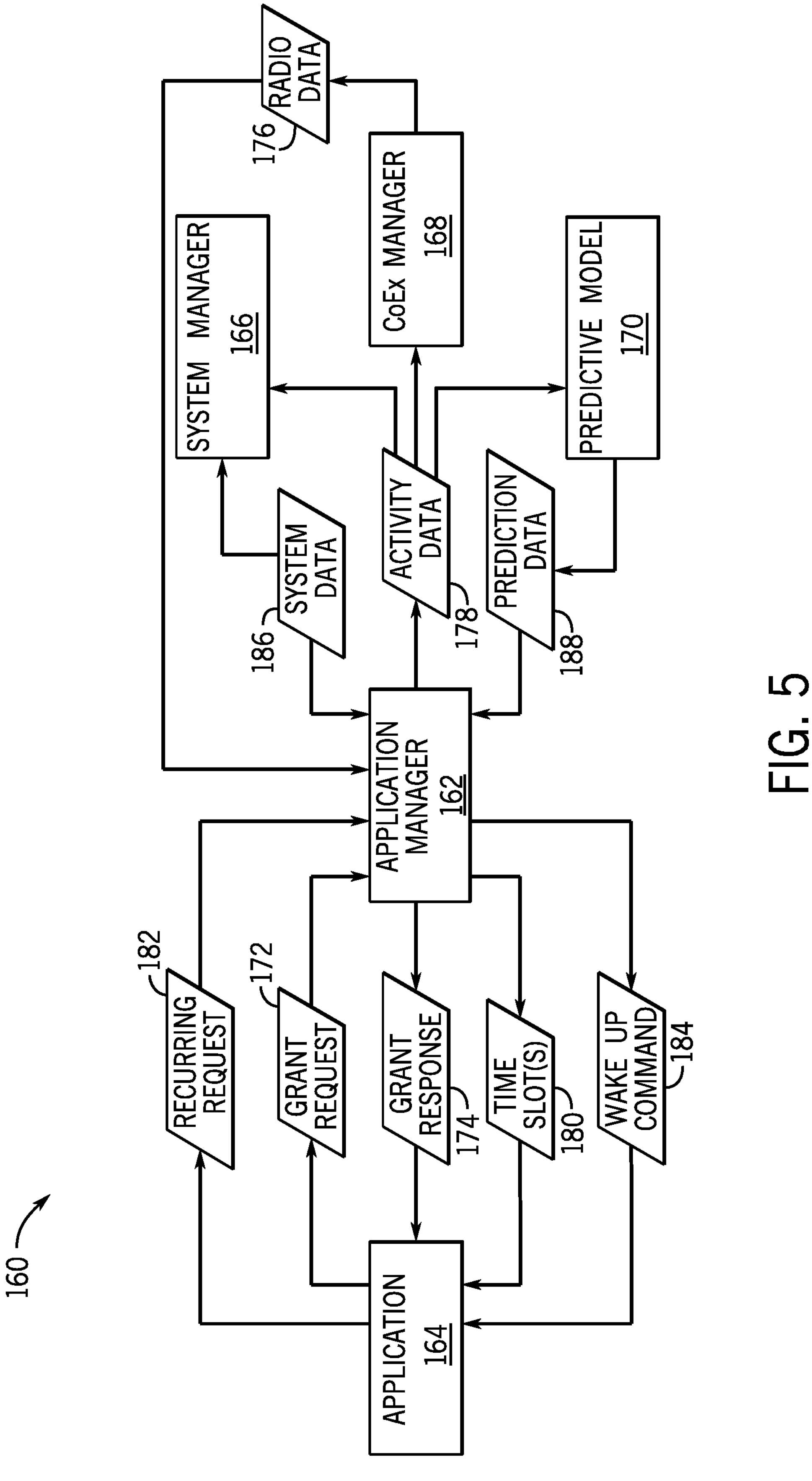
FIG. 5 is a block diagram of an application management system that may be utilized to manage opportunistic communication in a wireless network, such as the wireless network of FIG. 3, according to embodiments of the present disclosure.

Bearing this in mind, FIG. 5 is a block diagram of an application management system 160 that may be utilized to manage opportunistic communication. The application management system 160 and each component thereof may be implemented by the processor 12 of the electronic device 10, for example, by executing computer-readable instructions stored in the memory 14 of the storage 16 of the electronic device 10. As illustrated, the application management system 160 includes an application manager 162, an application 164, a system manager 166, a coexistence (CoEx) manager 168, and a predictive model 170. As such, the application manager 162, the application 164, the system manager 166, the coexistence (CoEx) manager 168, and the predictive model 170 may be implemented by the processor 12 executing computer-readable instructions. The application management system 160 may manage communication associated with the application 164, including opportunistic sampling of data that is collected by one or more devices associated with the application 164. Before describing the application management system 160 in more detail, it should be noted that the application management system 160 may include several applications 164, and the application manager 162 may manage each of the applications 164 as described below with respect to the application 164.

The application 164 may control or monitor one or more of the devices 104 included in the wireless network 100. For example, such devices may include home automation equipment (including, but not limited to switches, outlets, controllers, irrigation or sprinkler system equipment, sensors, lights, thermostats), wireless (or wired) routers, network extenders, or power equipment (e.g., controllers, power storage devices, solar panels)), smart appliances (e.g., refrigerators, dishwashers, washers, dryers, etc.), smart door locks, security equipment (e.g., cameras, lights, motion sensors, infrared sensors, etc.), water meters, gas meters, power meters, and other devices that may communicate wirelessly with the wireless network 100. A user of the application 164 may access the application 164, for example via a user interface provided on the display 18 of the electronic device 10 and interact with the user interface of the application 164 to control or monitor the associated devices, which may include seeing data collected by the device(s) associated with the application 164, data generated by analyzing data collected by the device(s) associated with the application 164, and changing settings associated with the device(s) associated with the application 164.

The device(s) in the wireless network 100 associated with the application 164 may communicate opportunistically. For example, one device may include an electronic power meter that monitor or tracks electrical power consumed in a particular place, such as a residence or office, and the application 164 may output (e.g., display) an amount of power that the power meter has determined has been consumed (e.g., within a period of time such as a day, week, month, billing cycle, or year). The device may accordingly have data that is to be communicated to the electronic device 10 so that a user may view the data, monitor the device, or control device. The application 164 associated with the device may send a grant request 172 to the application manager 162 to request access to the transceiver 30 of the electronic device 10, for instance, to enable the electronic device 10 to receive data that is to be transmitted by a device associated with the application 164 or to transmit data to the device (e.g., in response to receiving a user input in a user interface of the application 164 to modify one or more settings associated with device).

The application manager 162 may respond to the grant request 172 (e.g., in the form of a grant response 174) indicating whether the transceiver 30 is available. For example, the application manager 162 may determine whether the transceiver 30 is active (e.g., unavailable due to being in a high radio activity state such as during one of the periods 132 of FIG. 4) or inactive (e.g., in a low radio activity state such as time slot 136A or time slot 136B of FIG. 4) based on radio data 176 received from the CoEx manager 168 that is indicative of the real-time and/or historical use of the transceiver 30. The CoEx manager 168 may include a software application that manages the operation of the transceiver 30 (e.g., to control when the transceiver 30 transmits and receives wireless signals) or tracks a state of the transceiver 30. The CoEx manager 168 may manage coexistence of different radios, transceivers, and/or usage of communication protocols, to enable efficient communication and/or interaction between the different radios, transceivers, and/or usage of communication protocols, for example, without occurrence of interference. As an example, the CoEx manager 168 may manage radios, transceivers, and/or usage of Thread, Zigbee, Bluetooth® and/or WiFi in the 2.4 GHz frequency bands, and so on. The application manager 162 may send activity data 178 to the CoEx manager 168, which may be indicative of the application 164 having sent the grant request 172 (or include the grant request 172). In response, the CoEx manager 168 may send the radio data 176, which may indicate whether the transceiver is in a high radio activity state (e.g., one of the periods 132 of FIG. 4 in which the transceiver 30 is transmitting or receiving) or a low radio activity state (e.g., when the transceiver 30 is not transmitting or receiving, such as time slot 136A or time slot 136B of FIG. 4). The application manager 162 may send the grant response 174 to the application 164 indicating whether the grant request 172 has been granted. For example, when the transceiver 30 is in a low radio activity state, the grant response 174 may indicate that the grant request 172 has been granted, in which case the data associated with application 164 to be transmitted to, or received from, the device(s) associated with the application 164 will be transmitted or received via the transceiver 30. Conversely, when the transceiver 30 is in a high radio activity state, the grant response 174 may indicate that the grant request is denied, meaning the data of the device(s) associated with the application 164 will not be transmitted or received.

When the grant request 172 is denied (as indicated by the grant response 174), the application 164 may send a subsequent grant request 172 or multiple grant requests 172, for example, until the application 164 receives a grant response 174 indicating that the transceiver 30 is not active (e.g., in a low radio activity state). As discussed above, this may lead to an undesired amount of time passing before the data associated with the application is transmitted or received. Additionally, because the application 164 may repeatedly send the grant requests 172, the application 164 may be unable (or less likely) to return to a background or low-power state, which may cause an undesired amount of electrical power of the power source 29 to be used, which may be particularly significant in embodiments of the electronic device 10 in which the power source 29 is or includes a battery.

To reduce the occurrence of grant requests 172 that result in grant responses 174 indicating the that transceiver 30 is active (e.g., in a high radio activity state), the application manager 162 may determine one or more time slots 180 during which the transceiver 30 is in or is likely to be in a low radio activity state. Additionally, the application manager 162 may enable the application 164 to utilize a recurring request 182 (e.g., a request for recurring access to the transceiver at a particular time interval), and the application manager 162 may send a wake up command 184 to bring the application 164 out of a low power (e.g., background) state to send grant request 172 during one of the time slots 180. As such, the application manager 162 may enable the application 164 to send grant requests 172 at times (e.g., in time slots) which the transceiver 30 is in a low radio activity state or relatively more likely to be in a low radio activity state.

For example, when the application manager 162 receives the grant request 172, and the transceiver 30 is in a high radio activity state, in addition to sending the grant response 174 that is indicative of the transceiver 30 being in the high radio activity state, the application manager 162 may determine the time slots 180 and send the time slots 180 or data indicative of the time slots 180 to the application 164 in the grant response 174 or separately from the grant response 174. The time slots 180 may be future times at which the transceiver 30 will be in or is likely to be in a low radio activity state.

The application manager 162 may determine the time slots 180 based on system data 186 generated by and received from the system manager 166, the radio data 176 generated by and received from the CoEx manager 168, prediction data 188 generated by and received from the predictive model 170, or any combination of the system data 186, the radio data 176, and the prediction data 188. The system manager 166 may include a software application executed by the processor 12 that can track a status of one or more components on the electronic device 10, such as the display 18 and the power source 29, and the status of such components may be included in, or indicated by, the system data 186. For instance, the system data 186 may indicate a status of the display 18 (e.g., sleep or on/off status, actively displaying content, or the like) and the power source 29 (e.g., remaining (battery) power of the power source 29, whether the power source 29 is charging, and/or a power mode that the electronic device 10 is using, such a normal mode, high performance mode, or power saving mode). In one embodiment, the application manager 162 may determine that the time slots 180 correspond to times when the display 18 may be asleep or have an off status, the power source 29 has a remaining power above a threshold value (e.g., ten percent, fifteen percent, twenty-five percent, fifty percent, or any other suitable percentage value), the power source 29 is charging, the electronic device 10 is not utilizing a power saving mode or high performance mode, or any combination thereof.

The application manager 162 may also determine the time slots 180 based on the radio data 176. As described above, the radio data 176 may include current (e.g., real-time) and/or historical data regarding states of the transceiver 30. The states may include or indicate whether the transceiver 30 is active (e.g., in a high radio activity state) or inactive (e.g., in a low radio activity state) with respect to one or more types of wireless communication or wireless networks, such as, but not limited to the types of networks discussed above with respect to the network interface 26. The application manager 162 may determine that the time slots 180 are times that the transceiver is in a low radio activity state.

The application manager 162 may also determine the time slots 180 based on prediction data 188 generated by the predictive model 170. The predictive model 170 may include a software application or be included in a software application that is executed by the processor 12. The predictive model 170 may be generated by or utilize machine learning techniques, and the predictive model 170 may determine the times slots 180 and send the time slots 180 or data indicative of the time slots 180 in the prediction data 188 to the application manager 162. In particular, the predictive model 170 may receive the system data 186, radio data 176, activity data 178, and other data that, in some embodiments may be included in the system data 186. The other data may include clock or time data, device usage data, location data indicative of a location of the electronic device 10, calendar entry data (e.g., in a calendar application of the electronic device 10), or any combination thereof. The device usage data (which, when related to applications, may be included in the activity data 178) may include current or historical data regarding user activity or applications. For instance, the predictive model 170 may determine times of day during which the transceiver 30 is more likely to be in a high radio activity state, which may include times when the user tends to stream video or music content using the electronic device 10, have voice calls, video calls, or meetings, or perform other activities that for which the transceiver 30 may utilized for a period of time. Such times may also be indicated by the calendar data. For example, if the calendar data includes an event that has the word "meeting" or "conference" and/or includes a link (e.g., a uniform resource locator (URL)), then the predictive model 170 may determine that the time the event is scheduled for may likely include a time of high radio activity. The predictive model 170 may identify the time slots 180 as periods of time in which the transceiver 30 is expected to or likely to be in a low radio activity state (or expected or likely to not be in a high radio activity state). As an example regarding location data, the predictive model may identify locations (e.g., within the user's residence or office) indicated by the location data, times in which the electronic device 10 is location in those locations, and the radio data 176 corresponding to those times to determine whether the transceiver (e.g., historically) is more likely to be in a high radio activity state or a low radio activity state. As such, the predictive model 170 may determine a time is likely to be a time of low radio activity (and therefore one of the time slots 180) based on the radio data 176, (e.g., current or historical data regarding states of the transceiver 30), the system data 186, the activity data 178, clock or time data, device usage data, location data indicative of a location of the electronic device 10, calendar entry data, or any combination thereof. In this manner, the application manager 162 may utilize the prediction data 188 that may indicate the time slots 180 to determine the time slots 180. In other words, the application manager 162 may determine the time slots 180 by utilizing the time slots identified by the predictive model 170 and included in the prediction data 188. Upon receiving the time slots 180 from the application manager 162, the application 164 may enter a power saving (e.g., background) state to conserve power and/or wait until a time corresponding to the time slots 180 occurs before sending a subsequent grant request 172.

As mentioned above, the application manager 162 may enable the application 164 to utilize a recurring request 182 (e.g., a request for recurring access to the transceiver at a particular time interval), and the application manager 162 may send a wake up command 184 to bring the application 164 out of a low power (e.g., background) state to send grant request 172 during one of the time slots 180. As such, the application manager 162 may enable the application 164 to send grant requests 172 at times (e.g., in time slots) which the transceiver 30 is in a low radio activity state or relatively more likely to be in a low radio activity state.

In particular, the recurring request 182 may identify that data for the application 164 is to be transmitted or received at an interval of time (e.g., every five minutes, every ten minutes, hourly, daily, etc.). The application manager 162 may determine the time slots 180 by determining time slots indicated by the prediction data 188 that enable the data to be transmitted or received at the interval (or, as discussed below with respect to FIG. 8, at a time approximately equal to the time interval). The application manager 162 may send the wake up command 184 to the application 164 to cause the application 164 to wake up (e.g., change from a background or low power state to an active state) and/or cause the application 164 to send a grant request 172, thereby enabling the data associated with the application 164 to be transmitted or received in accordance with the interval indicated by the recurring request 182. By doing so, the application manager 162 may enable the application 164 to remain in a low power state (e.g., background state) for longer periods of time (e.g., compared to when the application 164 may send the grant request 172 on its own at the interval repeatedly due to receiving grant responses 174 indicative of the transceiver being in a high radio activity state), thereby enabling the electronic device 10 to better conserve power of the power supply 29. Thus, the application 164 may remain the low power state until receiving the wake up command 184, and the application 164 may subsequently sent a grant request 172 to enable the application 164 access to the transceiver 30, for example, to receive data (e.g., sensor data) from a device in the wireless network 100 associated with the application 164 or to transmit a request to the device to send the sensor data to the electronic device 10.

Figure 6:
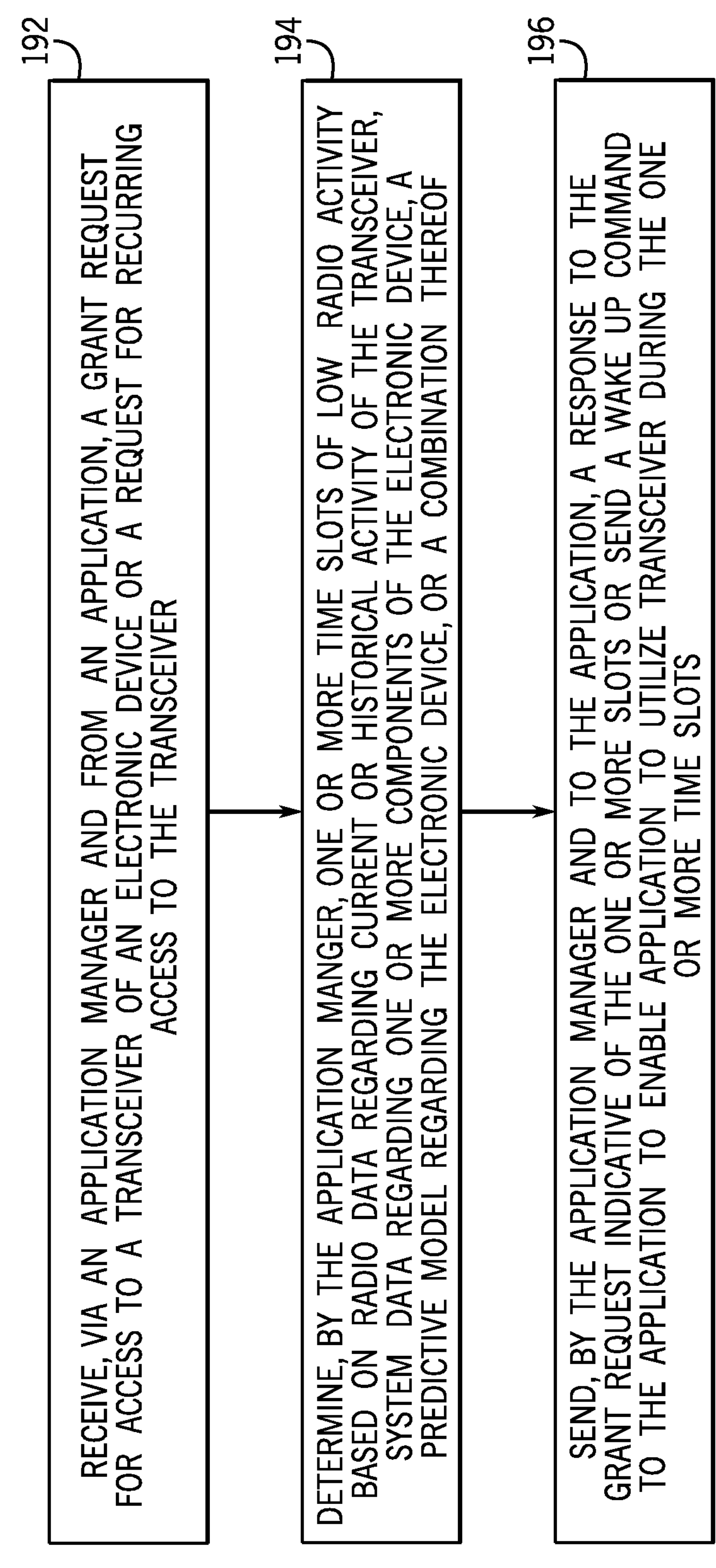
FIG. 6 is a flow diagram of a process for managing opportunistic data communication, according to embodiments of the present disclosure.

Keeping the discussion of the application management system 160 in mind, FIG. 6 is a flow diagram of a process 190 for managing opportunistic data communication. Any suitable device (e.g., a controller) that may control components of the electronic device 10, such as the processor 12 or the transceiver 30, may perform the process 190. In some embodiments, the process 190 may be implemented by executing instructions stored in a tangible, non-transitory, computer-readable medium, such as the memory 14 or storage 16, using the processor 12 or transceiver 30. For example, the process 190 may be performed at least in part by one or more software components, such as an operating system of the electronic device 10, one or more software applications of the electronic device 10, and the like. Indeed, the process 190 may be performed by the processor 12 implementing the application management system 160. As such, the process 190 may be performed by the application management 160 or a component thereof, such as the application manager 162. Furthermore, while the process 190 is described using steps in a specific sequence, it should be understood that the present disclosure contemplates that the described steps may be performed in different sequences than the sequence illustrated, and certain described steps may be skipped or not performed altogether.

In process block 192, the application manager 162 may receive, from the application 164, a grant request 172 for access to the transceiver 30 of the electronic device 10 or a request for recurring access (e.g., recurring request 182) to the transceiver 30. In process block 194, the application manager may determine one or more time slots of low radio activity (e.g., time slots 180 determined based on the radio data 176 regarding current or historical activity of the transceiver 30, the system data 186 regarding one or more components of the electronic device 10, the predictive model 170 regarding the electronic device 10, or a combination thereof). The time slots 180 may be determined as described above with respect to FIG. 5.

In process block 196, the application manager 162 may send, to the application 164, a response (e.g., grant response 174) to the grant request 172 indicative of the one or more time slots (e.g., time slots 180) or send, to the application 164, the wake up command 184 to enable the application 164 to utilize the transceiver 30 during the time slots 180. For instance, if in process block 192 the request is a grant request 172, then the response (e.g., grant response 174) sent by the application manager 162 may be or include the time slots 180. When the request is a request for recurring access (e.g., recurring request 182) to the transceiver 30, the application manager 162 may send the wake up command 184 to the application 164. Accordingly, the application manager 162 may enable the application 164 wait to send another grant request 172 during one of the time slots 180 or to enter (and remain in) a low power state until receiving the wake up command 184.

Figure 7:
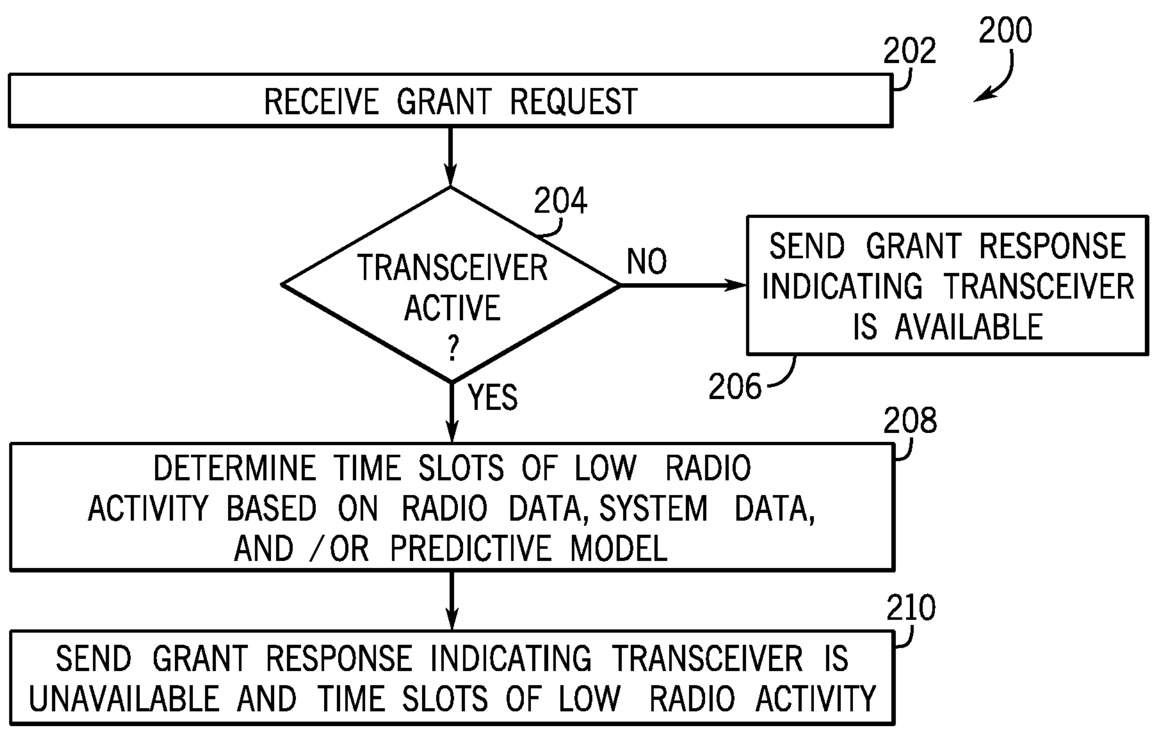
FIG. 7 is a flow diagram of a process for responding to a grant request for access to the transceiver of the electronic device of FIG. 1, according to embodiments of the present disclosure.

Continuing with the drawings, FIG. 7 is a flow diagram of a process 200 for responding to a grant request. Any suitable device (e.g., a controller) that may control components of the electronic device 10, such as the processor 12 or the transceiver 30, may perform the process 200. In some embodiments, the process 200 may be implemented by executing instructions stored in a tangible, non-transitory, computer-readable medium, such as the memory 14 or storage 16, using the processor 12 or transceiver 30. For example, the process 200 may be performed at least in part by one or more software components, such as an operating system of the electronic device 10, one or more software applications of the electronic device 10, and the like. Indeed, the process 200 may be performed by the processor 12 implementing the application management system 160. As such, the process 200 may be performed by the application management 160 or a component thereof, such as the application manager 162. Furthermore, while the process 200 is described using steps in a specific sequence, it should be understood that the present disclosure contemplates that the described steps may be performed in different sequences than the sequence illustrated, and certain described steps may be skipped or not performed altogether.

In process block 202, the application manager 162 may receive a grant request 172 from the application 164. As discussed above, the grant request 172 may be for access to the transceiver 30 of the electronic device 10, for instance, to be configured to receive or sample data from one or more devices in the wireless network 100 associated with the application 164.

In decision block 204, the application manager 162 may determine whether the transceiver 30 is active (or will be active during a future slot indicated by the grant request 172). As described above with respect to FIG. 5, the application manager 162 may make such a determination based on the radio data 176 received from the CoEx manager 168. Upon determining that the transceiver 30 is not active, in process block 206, the application manager 162 may send the grant response 174 to the application indicating that the transceiver is available.

Conversely, if in decision block 204 the application manager 162 determines that the transceiver 30 is active, in process block 208, the application manager 162 may determine time slots 180 of low radio activity based on the radio data 176, the system data 186, the predictive model 170, or any combination thereof. The application manager 162 may determine the time slots 180 as described above with respect to FIG. 5.

In process block 210, the application manager 162 may send a response to the grant request (e.g., grant request 172) to the application 164 indicating the transceiver 30 is unavailable, and the response may also include or be indicative of the time slots 180 determined at process block 208. In this way, in the event the transceiver 30 is unavailable the application 164 may learn of the time slots 180 determined by the application manager 162, for instance, to send a subsequent grant request 172 during the time slots 180 indicated by the grant response 174 sent at process block 210.

Figure 8:
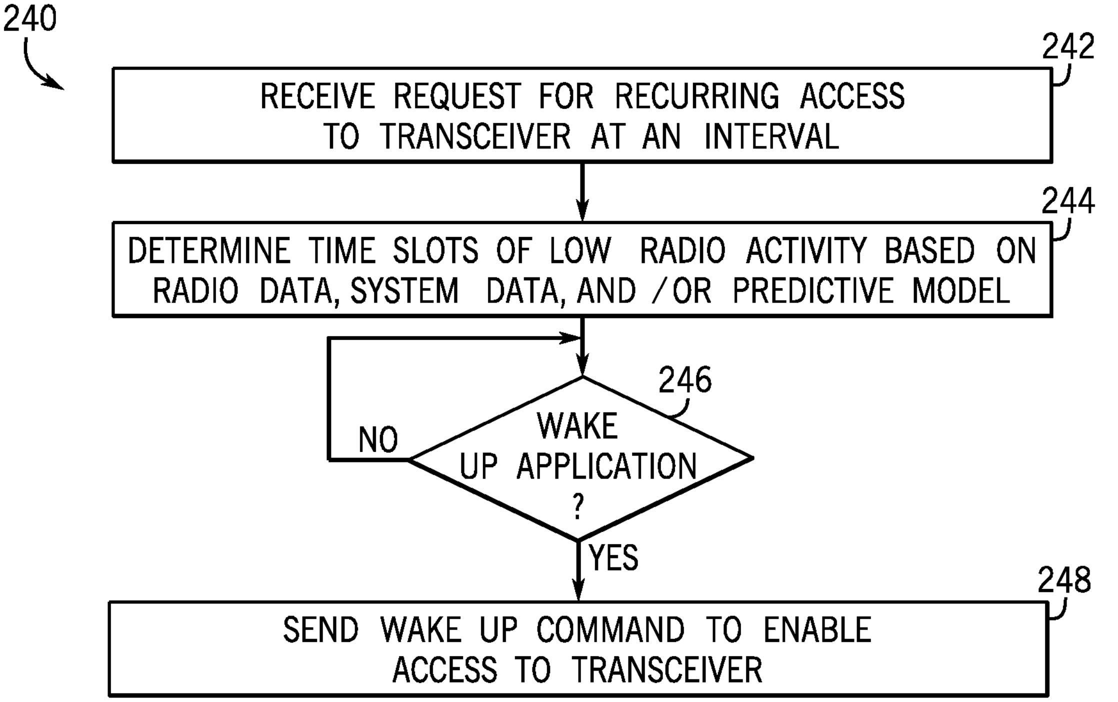
FIG. 8 is a flow diagram of a process for responding to requests for recurring access to the transceiver of the electronic device of FIG. 1, according to embodiments of the present disclosure.

Continuing with the drawings, FIG. 8 is a flow diagram of a process 240 for responding to requests for recurring access. Any suitable device (e.g., a controller) that may control components of the electronic device 10, such as the processor 12 or the transceiver 30, may perform the process 240. In some embodiments, the process 240 may be implemented by executing instructions stored in a tangible, non-transitory, computer-readable medium, such as the memory 14 or storage 16, using the processor 12 or transceiver 30. For example, the process 240 may be performed at least in part by one or more software components, such as an operating system of the electronic device 10, one or more software applications of the electronic device 10, and the like. Indeed, the process 240 may be performed by the processor 12 implementing the application management system 160. As such, the process 240 may be performed by the application management 160 or a component thereof, such as the application manager 162. Furthermore, while the process 240 is described using steps in a specific sequence, it should be understood that the present disclosure contemplates that the described steps may be performed in different sequences than the sequence illustrated, and certain described steps may be skipped or not performed altogether.

In process block 242, the application manager 162 may receive a request for recurring access (e.g., recurring request 182) to the transceiver 30 at a particular interval or time range. For instance, the request for recurring access may be indicative of the application 164 requesting access to the transceiver 30 every two minutes, five minutes, ten minutes, hour, or any other desired amount of time.

In process block 244, the application manager 162 may determine time slots of low radio activity based on the grant radio data 176, the system data 186, the predictive model 170, or any combination thereof. The application manager 162 may determine the time slots 180 as described above, for instance, with respect to FIG. 5.

In decision block 246, the application manager 162 may determine whether to wake up the application 164 #. In other words, the application manager 162 may determine whether to send the wake up command 184, for instance, to notify the application 164 to send the grant request 172. The application manager 162 may determine to wake up the application 164 based on the time slots 180 determined in process block 244 and the interval indicated by the request for recurring access (e.g., the recurring request 182). For example, the application manager 162 may determine that an amount of time approximately equal (e.g., within five seconds, ten seconds, fifteen seconds, thirty second, or a suitable amount of time that is greater than thirty seconds) to the interval has elapsed since the grant request 172 was received or the last time a wake up command 184 was sent to the application 164. The application manager 162 may also determine that there are one or more time slots 180 (as determined in process block 244) that may coincide with such a time. Thus, when there are one or more time slots 180 that are likely to be available when the interval (or an amount of time approximately equal to the interval) has elapsed, the application manager 162 may determine to wake the application 164. Accordingly, in process block 248, the application manager 162 may send the wake up command 184 (which may include or indicate the time slots 180) to the application 164, and the application 164 may send the grant request 172 to the application manager, request that the transceiver 30 receive data from the device(s) associated with the application 164, or both.

Conversely, if in decision block 246, the application manager 162 determines not to wake up the application 164, the process may return to decision block 246, and the application manager may reassess whether to wake up the application 164. In other words, the application manager 162 may continue to evaluate whether to send the wake up command 184. In this way, the application 164 may be maintained in a low power state (e.g., background state) for relatively longer periods of time (e.g., compared to when the recurring request 182 is not utilized), thereby enabling the electronic device 10 to conserve power of the power source 29.

It should be noted that the process 200 and the process 240 may be performed as a sequence. For example, the process 200 may be performed after the process 240. In other words, the operations discussed above with respect to process block 202 may be performed after, or in response to, performing the operations discussed above with respect to process block 248.

As used herein, machine-learning may refer to algorithms and statistical models that computer systems (e.g., including the electronic device 10) use to perform a specific task with or without using explicit instructions. For example, a machine-learning process may generate a mathematical model based on a sample of data, known as "training data," in order to make predictions or decisions without being explicitly programmed to perform the task.

Depending on the inferences to be made, the predictive model 170 may implement different forms of machine-learning. For example, in some embodiments (e.g., when particular known examples exist that correlate to future predictions or estimates that the machine-learning engine may be tasked with generating), a machine-learning engine may implement supervised machine-learning. In supervised machine-learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine-learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine-learning engine to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine-learning engine may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine-learning engine may implement other machine-learning techniques, such as those based on estimated density and graph connectivity.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:

a transceiver configured to communicatively couple to a wireless mesh network;

processing circuitry operatively coupled to the transceiver and configured to:

receive, at an application manager, a grant request for recurring access to the transceiver from an application, the grant request for recurring access being indicative of a time interval at which data associated with a router device or an end device is to be transmitted by the router device or the end device;

determine, by the application manager, one or more time slots of no radio activity based on radio data regarding current or historical activity of the transceiver, system data regarding one or more components of the electronic device, a predictive model regarding the electronic device, or a combination thereof;

cause transmission of, by the application manager and to the application, a response to the grant request indicative of the one or more time slots; and communicate with the router device or the end device associated with the application during the one or more time slots, the router device or the end device communicatively coupled to the electronic device by the wireless mesh network.

2. The electronic device of claim 1, wherein the one or more time slots of no radio activity correspond to one or more times at which the transceiver is not expected to be transmitting or receiving data over a frequency band.

3. The electronic device of claim 2, wherein the frequency band comprises a 2.4 gigahertz (GHz) frequency band.

4. The electronic device of claim 1, wherein the processing circuitry is configured to:

in response to receiving the grant request, determine, at the application manager, that the transceiver is active; and determine the one or more time slots in response to the transceiver being active.

5. The electronic device of claim 4, wherein the processing circuitry is configured to:

receive, at the application manager, a second grant request at a time corresponding to a time slot of the one or more time slots;

in response to receiving the second grant request, determine, by the application manager, that the transceiver is idle; and cause transmission of, by the application manager and to the application, a second response indicative of the transceiver being idle.

6. The electronic device of claim 1, wherein the grant request comprises a request to utilize the transceiver to transmit data using the wireless mesh network to another electronic device, wherein the wireless mesh network comprises an Institute of Electrical and Electronics Engineers (IEEE) Standard 802.15.4 network.

7. The electronic device of claim 1, wherein the processing circuitry is configured to determine the one or more time slots based on the radio data, wherein the radio data comprises a plurality of states for a plurality of types of wireless networks, wherein each state of the plurality of states is indicative of whether the transceiver is currently communicating using a type of wireless network of the plurality of types of wireless networks.

8. A non-transitory computer-readable medium comprising instructions that, when executed by processing circuitry of an electronic device, cause the processing circuitry to:

receive, at an application manager, a grant request for recurring access to a transceiver of the electronic device from an application, the grant request for recurring access being indicative of a time interval at which data associated with a router device or an end device is to be transmitted by the router device or the end device;

determine, by the application manager, one or more time slots of no radio activity based on radio data regarding current or historical activity of the transceiver, system data regarding one or more components of the electronic device, a predictive model regarding the electronic device, or a combination thereof; and cause transmission of, by the application manager and to the application, a response to the grant request indicative of the one or more time slots.

9. The non-transitory computer-readable medium of claim 8, wherein the one or more time slots of no radio activity correspond to one or more times at which the transceiver is not expected to be transmitting or receiving data over a frequency band.

10. The non-transitory computer-readable medium of claim 9, wherein the frequency band comprises a 2.4 gigahertz (GHz) frequency band.

11. The non-transitory computer-readable medium of claim 8, wherein the instructions, when executed, cause the processing circuitry to:

in response to receiving the grant request, determine, by the application manager, that the transceiver is active; and determine the one or more time slots in response to the transceiver being active.

12. The non-transitory computer-readable medium of claim 11, wherein the instructions, when executed, cause the processing circuitry to:

receive, at the application manager, a second grant request at a time corresponding to a time slot of the one or more time slots;

in response to receiving the second grant request, determine, by the application manager, that the transceiver is idle; and cause transmission of, by the application manager and to the application, a second response indicative of the transceiver being idle.

13. The non-transitory computer-readable medium of claim 8, wherein the grant request comprises a request to utilize the transceiver to transmit data using a wireless mesh network to another electronic device, wherein the wireless mesh network comprises an Institute of Electrical and Electronics Engineers (IEEE) Standard 802.15.4 network.

14. The non-transitory computer-readable medium of claim 8, wherein the instructions, when executed, cause the processing circuitry to determine the one or more time slots based on the radio data, wherein the radio data comprises a plurality of states for a plurality of types of wireless networks, wherein each respective state of the plurality of states is indicative of whether the transceiver is currently communicating using a respective type of wireless network of the plurality of types of wireless networks.

15. A method to be performed by processing circuitry of an electronic device comprising:

receiving, at an application manager, a grant request for recurring access to a transceiver of the electronic device from an application, the grant request for recurring access being indicative of a time interval at which data associated with a router device or an end device is to be transmitted by the router device or the end device;

determining, by the application manager, one or more time slots of no radio activity based on a predictive model regarding the electronic device; and causing, by the application manager and to the application, transmission of a response to the grant request indicative of the one or more time slots.

16. The method of claim 15, wherein the one or more time slots of no radio activity correspond to one or more times at which the transceiver is not expected to be transmitting or receiving data over a frequency band.

17. The method of claim 16, wherein the frequency band comprises a 2.4 gigahertz (GHz) frequency band.

18. The method of claim 15, comprising:

in response to receiving the grant request, determining, by the application manager, that the transceiver is active; and determining the one or more time slots in response to the transceiver being active.

19. The method of claim 18, comprising:

receiving, at the application manager, a second grant request at a time corresponding to a time slot of the one or more time slots;

in response to receiving the second grant request, determine, by the application manager, that the transceiver is idle; and causing transmission of, by the application manager and to the application, a second response indicative of the transceiver being idle.

20. The method of claim 15, wherein the grant request comprises a request to utilize the transceiver to transmit data using a wireless mesh network to another electronic device, wherein the wireless mesh network comprises an Institute of Electrical and Electronics Engineers (IEEE) Standard 802.15.4 network.

* * * * *